United States Patent [19]

Hayashi

[11] Patent Number: 5,163,069
[45] Date of Patent: Nov. 10, 1992

[54] PATTERN SYNCHRONIZING CIRCUIT AND METHOD

[75] Inventor: Mishio Hayashi, Saitama, Japan

[73] Assignee: Advantest Corporation, Tokyo, Japan

[21] Appl. No.: 747,347

[22] Filed: Aug. 20, 1991

[30] Foreign Application Priority Data

Aug. 22, 1990 [JP] Japan .................. 2-220582

[51] Int. Cl.$^5$ ............................................. H04L 7/00
[52] U.S. Cl. ................................ 375/108; 371/47.1
[58] Field of Search ............... 375/10, 106, 114, 116, 375/108; 370/105.4, 106, 107; 371/47.1

[56] References Cited

U.S. PATENT DOCUMENTS

| | | | |
|---|---|---|---|
| 3,824,548 | 7/1974 | Sullivan et al. | 375/116 |
| 4,254,492 | 3/1981 | McDermott, III | 375/108 |
| 4,445,116 | 4/1984 | Grow | 375/116 |
| 4,972,442 | 11/1990 | Steierman | 375/108 |
| 5,054,035 | 10/1991 | Tarallo et al. | 375/114 |

Primary Examiner—Stephen Chin
Attorney, Agent, or Firm—Staas & Halsey

[57] ABSTRACT

An input pattern is re-timed in a re-timing circuit by an input clock signal of the same frequency as that of the input pattern, and the re-timed input pattern and a reference pattern generated by a reference pattern generator in synchronization with the input clock signal are compared by a digital error detector to detect a mismatch between them. When the error rate dependent on the thus detected mismatch is larger than a predetermined value, an inhibit control circuit inhibits one input clock pulse which is applied to the reference pattern generator, and when the error rate is smaller than the predetermined value, the inhibit control circuit generates a pattern synchronization establishment signal. When the pattern synchronization establishment signal disappears, a one-shot circuit generates a pulse of a certain width, and if the pattern synchronization establishment signal is not generated again in this while, a T flip-flop is triggered by the trailing edge of the pulse of the certain width. The output of the T flip-flop thus triggered is applied to an inverter, which inverts the polarity of the input pulse which is applied to the reference pattern generator and the re-timing circuit.

9 Claims, 3 Drawing Sheets

PATTERN SYNCHRONIZING CIRCUIT AND METHOD

BACKGROUND OF THE INVENTION

The present invention relates to a pattern synchronizing circuit and method for use with, for example, a digital error detector to produce from an input clock a reference pattern synchronized with an input pattern.

In general, a digital error in the output of a certain apparatus or transmission line having input thereinto a code signal is detected in such a manner as shown in FIG. 1. A test pattern generator 11 generates a test pattern P which repeats a bit pattern of a predetermined length, such as a pseudo-random binary sequence (PRBS) having a desired data bit cycle, and a test clock signal CK which rises substantially at the intermediate point of each data bit cycle of the test pattern P and has the same period as that of the data bit cycle. The test pattern P and the test clock signal CK are applied to a device under test 12 and a digital error detector 13. An output pattern P' of the device under test 12 is provided to the digital error detector 13. The test pattern P of one period is, for example, $2^{23}-1$ bits in length. In the digital error detector 13 a test pattern synchronized with the input pattern P' is produced, as a reference pattern Pr, based on the test clock signal CK, and the reference pattern Pr and the output pattern P' from the device under test 12 are compared to detect a digital error in the latter.

FIG. 2 shows a conventional pattern synchronizing circuit disclosed in the present inventor's U.S. Pat. No. 4,878,233 for use in the digital error detector 13 to create the reference pattern Pr synchronized with the input pattern P'. The input pattern P' from a pattern input terminal 14 is applied to a re-timing circuit 15, which is formed by a D flip-flop and in which the input pattern P' is re-timed by the input clock signal CK which is provided via a variable delay circuit 17 from a clock input terminal 16. The input pattern thus re-timed is applied to an exclusive-OR circuit 19 in a digital error detector circuit 18, wherein it is compared with the reference pattern Pr from a reference pattern generator 21. The output of the exclusive-OR circuit 19 is applied to a gate 22, which is supplied with the output clock of the variable delay circuit 17. The exclusive-OR circuit 19 outputs a "1" or "0", depending on whether or not the logical values of the input patterns match each other. The output from the exclusive-OR circuit 19 is a NRZ waveform. In the gate 22 the NRZ waveform output is ANDed with the clock signal from the variable delay circuit 17, by which it is converted to a RZ waveform. When the input pattern from the re-timing circuit 15 does not match the reference pattern Pr, one pulse is output, as a digital error detected pulse, to a terminal 23 for each data bit cycle of the above-mentioned input pattern, and the detected pulse is applied to, for example, a high precision error rate detector (not shown).

The output clock signal of the variable delay circuit 17 is provided via an inhibit gate 24 to the reference pattern generator 21, which produces the reference pattern Pr, based on the clock signal. When the reference pattern is not synchronized with the input pattern, many digital error detected pulses are produced. The digital error detected pulses are supplied to a simple-structured error rate detector 25 which is formed by a frequency divider and by which the error rate is roughly measured. When the error rate is larger than $10^{-3}$, for instance, an inhibit gate control circuit 26 is caused to generate one inhibit pulse INH (which has a pulse width large enough to inhibit the input clock by one period), which is supplied to the inhibit gate 24, inhibiting the passage therethrough of one pulse of the input clock to delay the phase of the reference pattern Pr for one clock relative to the input pattern. Following this, the error rate is measured again and compared with the above-mentioned value $10^{-3}$, and if the former is larger than the latter, then another inhibit pulse INH is produced and the above-said operation is repeated. If the error rate is lower than $10^{-3}$, then no inhibit pulse INH is produced, but instead a pattern synchronization establishment signal is output via a terminal 27. This signal is used to indicate the establishment of synchronization of the input pattern with the reference pattern. The basic construction of such a conventional pattern synchronizing circuit is disclosed in U.S. Pat. No. 4,878,233, except re-timing of the input pattern.

As shown in FIG. 3, dead zones Z, which depend on the hold time $t_h$ and the setup time $t_s$ of the D flip-flop forming the re-timing circuit 15, exist before and after a data conversion node of the input pattern P' and when a jitter is present in the input pattern P', the dead zones Z become wider corresponding to the width of the jitter. In the case where the leading edge of the input clock CK which is supplied to the re-timing circuit 15 is within the dead zone z as depicted in FIG. 3, Rows A, B and C, the output of the re-timing circuit 15 does not become correct data and no output pattern is established, but instead a pattern containing a large error (an error rate above $10^{-3}$, for example) is usually output. In this instance, no pattern synchronization establishment signal would be produced, even if it is repeated to delay the reference pattern Pr for one cycle by inhibiting the passage of the input clock CK through the gate 22 with the inhibit pulse INH. Now, let Lp, Tc and Td represent the length of the test pattern, the period of the input clock CK and the time until it is decided whether the error rate is higher or lower than $10^{-3}$ after the application of the inhibit pulse INH, respectively. In the case where no pattern synchronization is established even after the lapse of a maximum time necessary for the pattern synchronization, $Ts=Lp\times(Tc+Td)$, an operator adjusts the variable delay circuit 17 to slightly delay the phase of the input clock CK from the state of Row A to the state of Row B in FIG. 3, for example. Where the pattern synchronization is not established yet after the time Ts elapses again, the phase of the input clock CK is delayed to the state of FIG. 3C, and in the example of FIG. 3, the phase of the input clock CK is further delayed to the state of Row D in FIG. 3. Thus, the leading edge of the input clock signal CK enters a phase difference allowable range AR between the dead zones Z of the input pattern, and hence the pattern synchronization can be established.

As will be seen from the above, no effective means has been available for definitely judging that the leading edge of the input clock signal CK is in the dead zone z of the input pattern; therefore, the prior art repeats adjusting the variable delay circuit for each lapse of a fixed time—this is a cumbersome and time-consuming operation. This operation must be performed not only at the start of a test but also when the frequency of the input clock is changed during test and the leading edge of the input clock enters the dead zone of the input pattern.

SUMMARY OF THE INVENTION

It is therefore an object of the present invention to provide a pattern synchronizing circuit and method which permit automatic synchronization of the reference pattern with the input pattern in a short time.

With the pattern synchronizing circuit of the present invention, when the pattern synchronization establishment signal disappears, a one-shot circuit is triggered to generate a pulse of a time width larger than the maximum time Ts necessary for the establishment of synchronization. This pulse and the pattern synchronization establishment signal are applied to an OR circuit. In the asynchronous state a T flip-flop is triggered by the edge of the output of the OR circuit which is attributable to the trailing edge of the output pulse of the one-shot circuit. The output of the T flip-flop is supplied to an inverter, which inverts or does not invert the input clock signal to be supplied to the re-timing circuit, in accordance with the output of the T flip-flop.

With the synchronizing method of the present invention, in the case where no synchronization is established within a predetermined period of time after the detection of a step out, the input clock signal is inverted by the inverter, after which no operation is involved until the pattern synchronization is established.

DESCRIPTION OF THE PREFERRED EMBODIMENT

Figure 1:
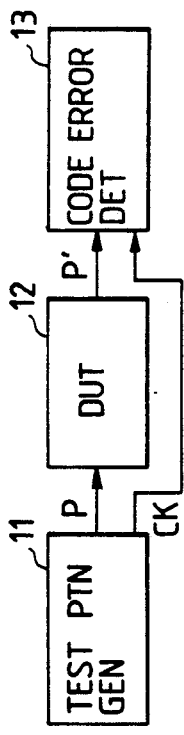
FIG. 1 is a block diagram showing an ordinary digital error detection arrangement.
Figure 4:
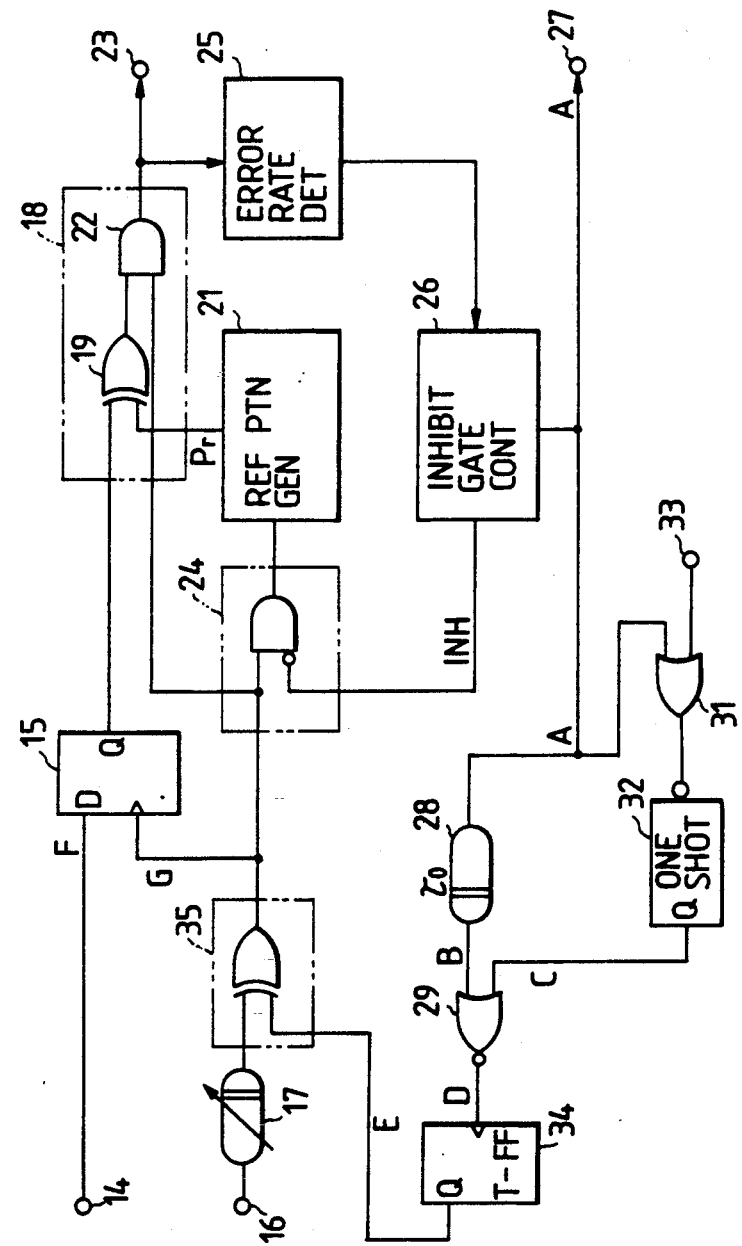
FIG. 4 is a block diagram illustrating an embodiment of the present invention.
Figure 2:
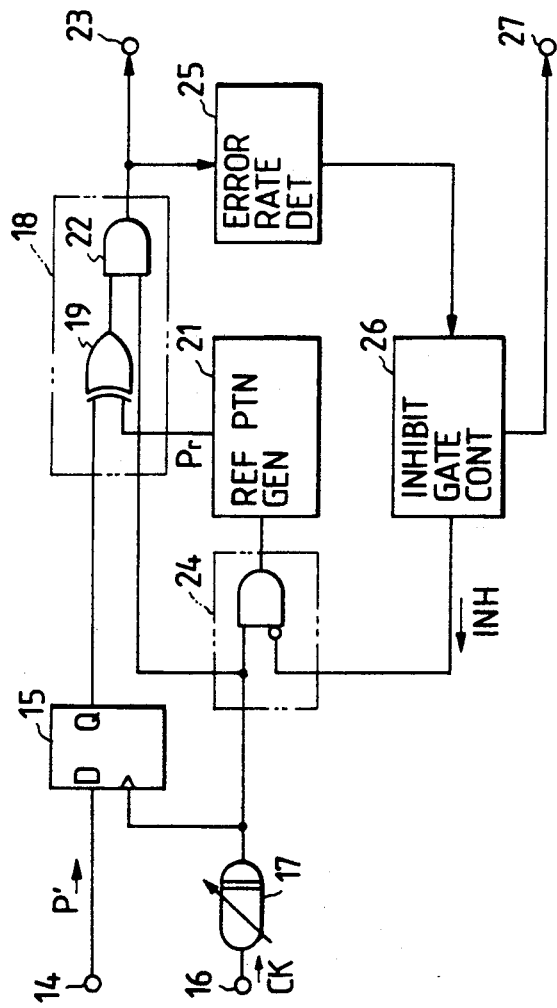
FIG. 2 is a block diagram showing a conventional pattern synchronizing circuit.
Figure 3:
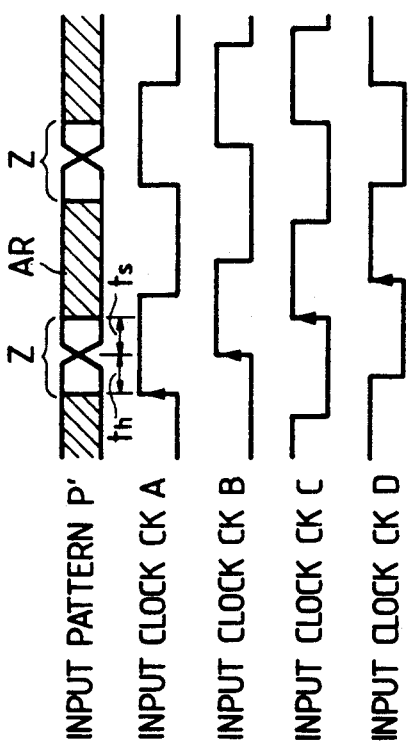
FIG. 3 is a graph showing the relationship between dead zones of an input pattern and an input clock signal.

FIG. 4 illustrates in block form an embodiment of the present invention, in which the parts corresponding to those in FIG. 2 are identified by the same reference numerals. According to the present invention, the pattern synchronization establishment signal at the terminal 27 also is provided via a delay circuit 28 to a NOR circuit serving as an OR gate, and at the same time, the pattern synchronization establishment signal is applied via an OR circuit 31 to a one-shot circuit 32. The OR circuit 31 is supplied with a trigger pulse via a terminal 33 at the start of the apparatus. The one-shot circuit 32 is triggered when the pattern synchronization establishment signal enters the step-out state (i.e. goes low), or it is triggered by the trigger pulse at the start of the apparatus, and the one-shot circuit 32, thus triggered, outputs a pulse of a width $T_o$ larger than the sum of the afore-mentioned maximum time Ts necessary for the pattern synchronization and the delay time $\tau_o$ of the delay circuit 28. A T flip-flop 34 is triggered by the leading edge of the output from the NOR circuit 29 and the output of the T flip-flop 34 is applied as a control signal to an exclusive or gate 35 connected in series between the clock input terminal 16 and the re-timing circuit 15 and acting as a phase inverter.

Figures 5, 6:
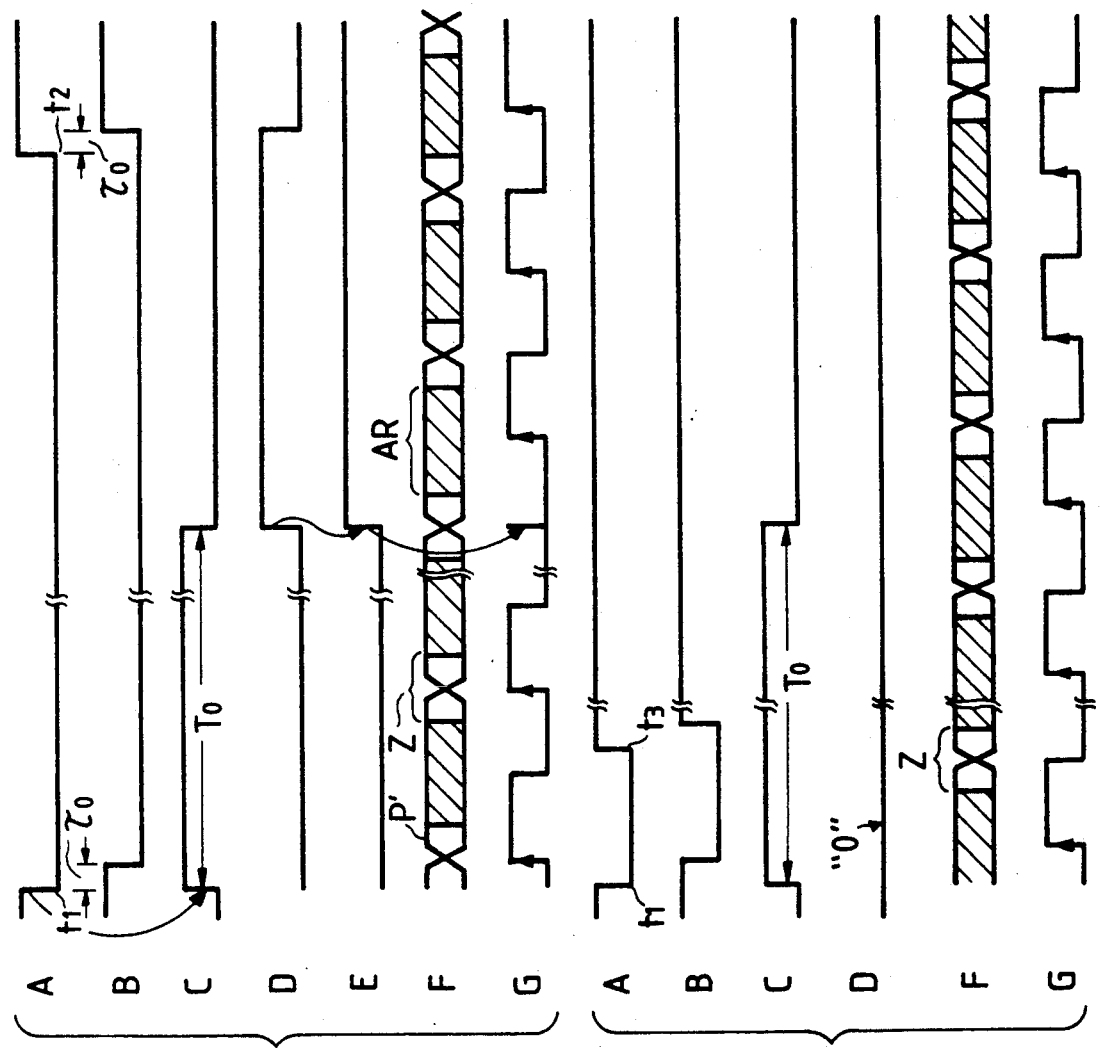
FIG. 5 is a timing chart showing waveforms occurring at respective parts in FIG. 4, for explaining an operation in the case of inverting the polarity of the input clock signal.
FIG. 6 is a timing chart showing waveforms occurring at respective parts in FIG. 4, for explaining an operation in the case where the polarity of the input clock signal is not inverted.

With such an arrangement, when the pattern synchronization state is changed to the asynchronous state by, for example, a change in the frequency of the input clock signal and the pattern synchronization establishment signal goes low at a time point $t_1$ as shown on Row A in FIG. 5, the output of the delay circuit 28 also goes low after the lapse of time $\tau_o$ as shown on Row B in FIG. 5, and the one-shot circuit 32 is triggered by the trailing edge of the pattern synchronization establishment signal and yields the pulse of width $T_o$ as depicted on Row C in FIG. 5. In this state, if the leading edge of the input clock signal which is applied to the re-timing circuit 15 is within the dead zone Z of the input pattern P' shown on Row F in FIG. 5, as depicted on Row G, no synchronization is established even after the lapse of the maximum time Ts necessary for the pattern synchronization. However, after the elapsed time $T_o$ both inputs to the NOR circuit 29 go low and the output from the NOR circuit 29 goes high as shown on Row D in FIG. 5. The T flip-flop 34 is triggered by the leading edge of the output from the NOR circuit 29 and the flip-flop 34 output goes high as depicted on Row E in FIG. 5. This high-level output is applied to the exclusive-OR gate 35 acting as a phase inverter, by which the polarity of the input clock signal to be supplied to the re-timing circuit 15 is inverted as shown on Row G in FIG. 5. Usually, the time length of the phase difference allowable range AR is larger than the time length of the dead zone Z, accordingly the leading edge of the inverted input clock signal is within the allowable range AR between adjacent data conversion nodes and correct re-timing takes place. As a result of this, synchronization is established at a certain time point, in this example, at a time point $t_2$ and the pattern synchronization establishment signal goes high as shown on Row A in FIG. 5.

In the case where the leading edge of the input clock signal is not within the dead zone Z of the input pattern as shown on Rows F and G when the reference pattern Pr goes out of step as depicted on Row A, in FIG. 6, the inhibit pulse INH is generated several times and synchronization is established at a time point $t_3$ before the lapse of time $T_o$ after the time point $t_1$ as shown on Row A and then the pattern synchronization establishment signal goes high. Accordingly, when the output of the one-shot circuit 32 goes low as shown on Row C in FIG. 6, the output of the NOR circuit 29 remains low as depicted on Row D in FIG. 6 and the T flip-flop 34 will not be triggered.

At the start of the apparatus the pattern synchronization establishment signal is low from the beginning, but since the one-shot circuit 32 is triggered by the trigger pulse from the terminal 33, the pattern synchronization is established within a time $2T_o$. Incidentally, if the delay circuit 28 is left out, there is a possibility that during the delay in the rise of the output pulse of the one-shot circuit 32 behind the rise of the pattern synchronization establishment signal A a whisker-like pulse is produced in the output of the NOR circuit 29 and the T flip-flop 34 is triggered by such a pulse. If there is no such possibility, the delay circuit 28 can be omitted. When the delay circuit 28 is employed, the time $\tau_o$ is selected to be shorter than the delay time of the one-shot circuit 32. The variable delay circuit 17 may also be omitted by use of the exclusive- OR gate (inverter) 35, but in the case where the input pattern contains many jitters, the relationship that the time of the dead zone is shorter than the time of the allowable range does not always hold, in which case adjustment by the variable delay circuit 17 is required.

As described above, according to the present invention, even if the leading edge of the input clock signal is in the dead zone of the input pattern, the phase of the input clock signal is automatically inverted after the lapse of time $T_0$, and consequently, synchronization is automatically established within a time slightly longer than twice the maximum time Ts necessary for synchronization and an operator need not perform any troublesome operations therefor.

It will be apparent that many modifications and variations may be effected without departing from the scope of the novel concepts of the present invention.

I claim:

1. A pattern synchronizing circuit, comprising:
   re-timing means supplied with an input pattern composed of a sequence of data having a frequency and an input clock signal having the frequency of said input pattern, for producing a re-timed input pattern using said input clock signal;
   reference pattern generating means for generating a reference pattern for said input pattern in synchronization with said input clock signal;
   digital error detecting means for comparing said reference pattern and said re-timed input pattern to detect a mismatch as a digital error;
   error rate detecting means supplied with the digital error output by said digital error detecting means, for detecting an error rate based on the digital error;
   control means for checking whether said error rate is larger than a predetermined value, and if larger, for controlling passage of said input clock signal to said reference pattern generating means to shift the phase of generation of said reference pattern in one direction, and if said error rate is smaller than said predetermined value, for generating a pattern synchronization establishment signal; and
   clock inverting means for responding to disappearance of said pattern synchronization establishment signal by inverting the polarity of said input clock signal applied to said reference pattern generating means and said re-timing means, if said pattern synchronization establishment signal is not generated within a predetermined period of time after the disappearance of said pattern synchronization establishment signal.

2. The pattern synchronizing circuit of claim 1, wherein said predetermined period of time is longer than a maximum time necessary for establishment of synchronization of said reference pattern generating means.

3. The synchronizing circuit of claim 1, wherein said control means includes: a control circuit which outputs an inhibit pulse when said error rate is larger than said predetermined value and generates said pattern synchronization establishment signal when said error rate is smaller than said predetermined value; and inhibit gate means which normally permits the passage therethrough of said input clock signal to said reference pattern generating means but, when supplied with said inhibit pulse, inhibits the passage therethrough of one pulse of said input clock signal.

4. The synchronizing circuit of claim 3, wherein said clock inverting means includes:
   invert signal generating means responsive to the disappearance of said pattern synchronization establishment signal to generate an invert signal when said pattern synchronization establishment signal is not produced until said predetermined period of time elaspses after the disappearance of said pattern synchronization establishment signal; and
   inverter means for inverting the polarity of said input clock signal upon generation of said invert signal for input into said inhibit gate means.

5. The synchronizing circuit of claim 4, wherein said invert signal generating means includes;
   waiting time pulse generating means responsive to the disappearance of said pattern synchronization establishment signal to generate a waiting time define pulse having a pulse width equal to sai predetermined period of time;
   a NOR circuit, operatively connected to said waiting time pulse generating means and said control circuit, for producing an output based on a NOR operation between said waiting time define pulse and said pattern synchronization establishment signal; and
   flip-flop means, an edge of the output of said NOR circuit, for generating said invert signal.

6. A pattern synchronizing circuit wherein an input pattern is re-timed by an input clock signal of identical frequency in a re-timing circuit, a reference pattern for said input pattern is generated by a reference pattern generator in synchronization with said input clock signal, a mismatch between said reference pattern and said re-timed input pattern is detected by a digital error detector, an error rate is detected by an error rate detector from the output of said digital error detector, and when said error rate is larger than a predetermined value, the phase of said reference pattern is shifted to synchronize said reference pattern with said input pattern, and when synchronized with each other, a pattern synchronization establishment signal is generated, the improvement comprising:
   a one-shot circuit responsive to disappearance of said pattern synchronization establishment signal to generate a pulse with a time width larger than a maximum time neccessary for establishment of synchronization of said reference pattern generator;
   a NOR circuit supplied with the output of said one-shot circuit and said pattern synchronization establishment signal;
   a T flip-flop triggered by the edge of the output of said NOR circuit; and
   inverter means, connected in series between an input terminal for said input clock signal and said re-timing circuit, for outputting said input clock signal with or without inversion in accordance with the output of said T flip-flop.

7. The pattern synchronizing circuit of claim 5 or 6, further including delay means for delaying said pattern synchronization establishment signal to be applied to said NOR circuit for a predetermined period of time.

8. A pattern synchronizing method, comprising the steps of:

(a) re-timing an input pattern using an input clock signal of the same frequency as that of said input pattern;

(b) generating a reference pattern in synchronization with said input clock signal;

(c) detecting a mismatch between said reference pattern and said re-timed input pattern and obtaining an error rate by said detecting;

(d) checking whether or not said error rate is larger than a predetermined value;

(e) shifting the phase of generation of said reference pattern by a predetermined amount when said error rate is larger than said predetermined value;

(f) generating a pattern synchronization establishment signal when said error rate is smaller than said predetermined value;

(g) detecting disappearance of said pattern synchronization establishment signal; and (h) inverting, when said pattern synchronization establishment signal is not generated within a prefixed period of time thereafter, the polarity of said input clock signal to thereby delay generation of said reference pattern and said re-timing by one clock pulse.

9. The synchronizing method of claim 8, wherein said prefixed period of time is longer than a maximum time necessary for establishment of synchronization between said input pattern and said reference pattern.

* * * * *